United States Patent Office 3,486,858
Patented Dec. 30, 1969

3,486,858
**METHOD FOR THE QUALITATIVE IDENTIFI-
CATION OF NITRILE ELASTOMERS**
Panagiotis L. Panagoulias, Highland Park, Mich., assignor to the United States of America as represented by the Secretary of the Army
No Drawing. Filed Mar. 2, 1967, Ser. No. 621,112
Int. Cl. G01n *31/22*
U.S. Cl. 23—230                                9 Claims

---

ABSTRACT OF THE DISCLOSURE

A method for the qualitative identification of nitrile elastomers comprising the steps of: reacting a test sample with zinc and acetic acid; further reacting said test sample with P-dimethylaminobenzaldehyde; and treating said twice reacted sample with nitric acid and acetic acid; said method yielding P-dimethylaminobenzalidenamin when said test sample contains a nitrile elastomer.

---

The invention described herein may be manufactured and used by or for the Government for government purposes without the payment to me of any royalty thereon or therefor.

The prior art methods for the qualitative identification of elastomers have begun almost universally with an initial pyrolysis of the sample material to be tested. Such pyrolysis causes a destructive distillation of the sample material. Subsequently, the vapors produced by the distillation are analyzed. The analysis is accomplished by passing the vapors produced by the distillation through one or more reagents which yield specifically colored solutions when the test sample contains a specified elastomer. Such methods very often yield ambiguous results, particularly when a number of elastomer compounds are present in the same test sample and the products of their individual distillations are mixed and then passed together through the reagent solution, to yield, at one time, the variety of colored reaction products which indicate the presence of each of the individual elastomers.

The present invention eliminates the necessity for pyrolysis of the test sample and provides a method which, by addition of certain chemical compounds to a properly prepared test sample, yields a distinct color reaction which provides a specific identification for the presence of nitrile elastomers. The nitrils are identified by using a specific procedure which eliminates the interference of other polymers or mixtures of polymers which may be present in the test sample.

It is therefore an object of the present invention to provide a method for the qualitative identification of nitrile elastomers under all conditions of occurrence.

Another object of the present invention is the provision of a non-pyrolytic and specific color producing method for the qualitative identification of nitrile elastomers under all conditions of occurrence.

Still another object of the present invention is the provision of a method of qualitatively identifying nitrile elastomers present as mixtures or compounds with other elastomers.

The following description will reveal other objects and advantages of this invention to those skilled in the analytical arts.

According to the present invention there is provided a non-pyrolytic method for the qualitative identification of nitrile elastomers under all conditions of occurrence.

More particularly, the invention provides a color producing qualitative identification of nitrile elastomers under all conditions of occurrence comprising the steps of: dissolving a test sample in a suitable solvent, preferably 2,2,4-trimethylpentane; reacting said test sample with zinc and acetic acid; further reacting said test sample with P-dimethylaminobenzaldehyde; and treating the twice reacted sample with nitric and acetic acid. This method yields a permanent yellowish-brown color when the test sample contains a nitrile elastomer.

There is thus substituted for the pyrolysis and vapor analysis of the prior art, a strictly chemical test having procedures which eliminate the effects or interference of elastomers other than nitrils which may be present as compounds or mixtures therewith.

According to the procedures herein disclosed, a small portion, about five (5) grams, of a sample to be tested is cut into small pieces and extracted with acetone according to ASTM Procedure D-297 for an 8-10 hour period. Since this procedure is designed for purposes of removing any traces of vulcanization, it is primarily a precautionary measure and as such may be utilized or not depending upon the nature of the sample being tested.

The extracted sample is then air dried at room temperature and about 2 grams thereof placed in a tube with 80 ml. of 2,2,4-trimethylpentane or other suitable solvent. The preferred solvent, 2,2,4-trimethylpentane is, chosen as solvent due to its inertness toward most elastomer compositions. Any other suitable solvent possessing this same property may, therefore, be substituted for the recommended solvent. This mixture forms the test sample solution. The solution once properly mixed, is then refluxed for a short period in order to insure that the solute sample is properly dissolved in the solvent. Although this refluxing period will vary according to the size of the sample, the amount of solvent utilized and the nature of the sample, the recommended period in the case where the above mentioned quantities of solute and solvent are used is from two to four hours.

Five ml. of this test sample solution are then transferred to a reaction vessel, such as a test tube, containing 0.1 gram of powdered zinc and 1–2 ml. of acetic acid. This mixture is heated at about 110 to 120 degrees centigrade until no more hydrogen gas is evolved. The elementary qualitative tests for hydrogen gas may of course be utilized to detect the presence of the hydrogen gas.

When hydrogen evolution has positively ceased, the reaction vessel is removed from the heating means, 0.1 gram of P-dimethylaminobenzaldehyde is added and this mixture of the latter compound and the reacted test sample solution heated to boiling for about one minute. This heating will produce a slightly yellow color.

A mixture of one drop of nitric acid (SP. GF. 1.42) and 2 ml. of acetic acid are then added to the above yellow solution and the reaction vessel and contents heated for a few seconds. In the presence of a nitrile elastomer, the solution will take on a permanent yellowish-brown color whose presence is a specific indication of the nitrile.

The above color production occurs because the zinc powder reduces the nitrile group of the polymer to a primary amine which, upon reaction with P-dimethylaminobenzaldehyde, forms P-dimethylaminobenzalidenamin. The latter compound produces a yellowish color whose intensity is increased with the addition of nitric acid.

What is claimed is:
1. A method for the qualitative identification of nitrile elastomers comprising the steps of:
   (a) reacting a test sample with zinc and acetic acid; and
   (b) further reacting said test sample with P-dimethylaminobenzaldehyde to form P-dimethylaminobenzalidenamin when said test sample contains a nitrile elastomer.
2. A method in accordance with claim 1 wherein said test sample is dissolved in an inert solvent to form a test sample solution prior to reaction with said zinc and acetic acid.

3. A method in accordance with claim 2 wherein said inert solvent consists essentially of 2,2,4-trimethylpentane.

4. A method in accordance with claim 2 wherein said test sample is extracted with acetone according to ASTM Procedure D-297 prior to being dissolved in said inert solvent.

5. A method in accordance with claim 2 wherein said zinc consists essentially of powdered zinc.

6. A method in accordance with claim 2 wherein said test sample solution is refluxed for a two to four hour period immediately subsequent to formation and prior to reaction with said zinc and said acetic acid.

7. A method in accordance with claim 2 wherein reaction of said test sample with said zinc and said acetic acid is accomplished by heating to a temperature of from 110 to 120 degrees centrigrade.

8. A method in accordance with claim 2 wherein there is produced after reaction with P-dimethylaminobenzaldehyde a yellow-colored solution when said test sample contains a nitrile elastomer.

9. A method in accordance with claim 8 wherein said P-dimethylaminobenzalidenamin is further reacted with a mixture of nitric and acetic acid to produce an intensified yellowish-brown color.

References Cited

Burchfield, H., Chem. Abstr. 40,3292$^2$, 1946.
Mano, E. B., Chem. Abstr. 57,997f, 1962.
ASTM Standards on Rubber Products 1957, pp. 132, 133 relied on. Copy in POSL. TS1892A45.

MORRIS O. WOLK, Primary Examiner

R. M. REESE, Assistant Examiner